PERMANENT MAGNET RETAINING ARRANGEMENT FOR HIGH SPEED ROTORS

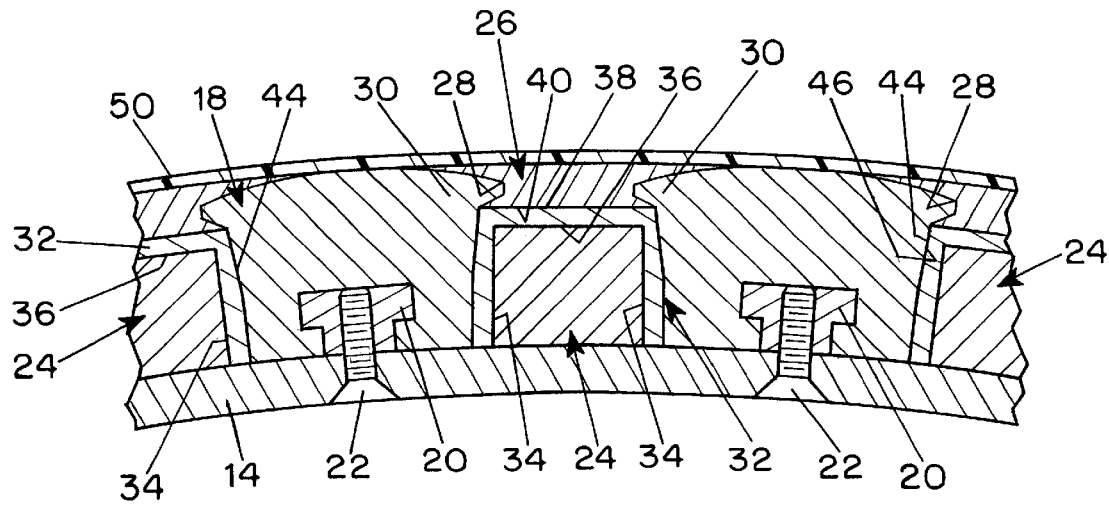

BACKGROUND OF THE INVENTION

This invention relates to arrangements for retaining permanent magnets radially in position in permanent magnet rotors for electric machines operating at high speed.

Conventional arrangements for retaining magnets in position in rotors for electric machines include slot wedges which span the distance between adjacent pole pieces across the radially outer surface of the magnets. Such arrangements have limited centrifugal load carrying capability.

The Burson U.S. Pat. No. 4,179,634 discloses a magneto rotor having permanent magnets which are retained in a cavity formed in the rotor by pole pieces disposed on opposite sides of the magnet and retained by retaining pins received in axially extending slots in the pole pieces.

The Patent to Morill U.S. Pat. No. 2,516,901 discloses a permanent magnet rotor having a hub to which permanent magnets are affixed by screws engaging shoulders on the magnets. In addition, rings may be cast around the shoulders of the magnets and the screws to assist in retaining the magnets on the hub.

In the magneto shown in the Iwata et al. U.S. Pat. No. 5,811,908, U-shaped permanent magnet retention channels made of magnetic material have projections at the outer ends of the walls which are received in corresponding grooves in adjacent pole pieces.

According to the Tomite et al. U.S. Pat. No. 4,745,319, permanent magnets are secured to the inner surface of a surrounding yoke by attaching one surface of a U-shaped elastic retainer member to the inner surface of the yoke and attaching the ends of the U-shaped retainer to edges of adjacent magnets which are to be retained in the yoke.

SUMMARY OF THE INVENTION

Accordingly, it is an object of the present invention to provide a retaining arrangement for permanent magnets in a rotor for an electric machine which overcomes disadvantages of the prior art.

Another object of the invention is to provide a retaining arrangement for permanent magnets by which they are secured effectively in the radial direction during high speed operation of a rotor.

These and other objects of the invention are attained by providing a retaining arrangement in which permanent magnets are retained in a permanent magnet rotor by U-shaped retainers supported from a rotor rim, the retainers being made of nonmagnetic material and having a smooth channel to receive magnets and provide radial support. In one embodiment the U-shaped retainers have laterally outer surfaces which converge inwardly in the radially outward direction and the adjacent opposed pole pieces, which are affixed to the rotor rim, have corresponding lateral surfaces which converge inwardly in the radially outward direction. In another embodiment, the U-shaped retainer is connected to the rotor rim by fasteners such as screws.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
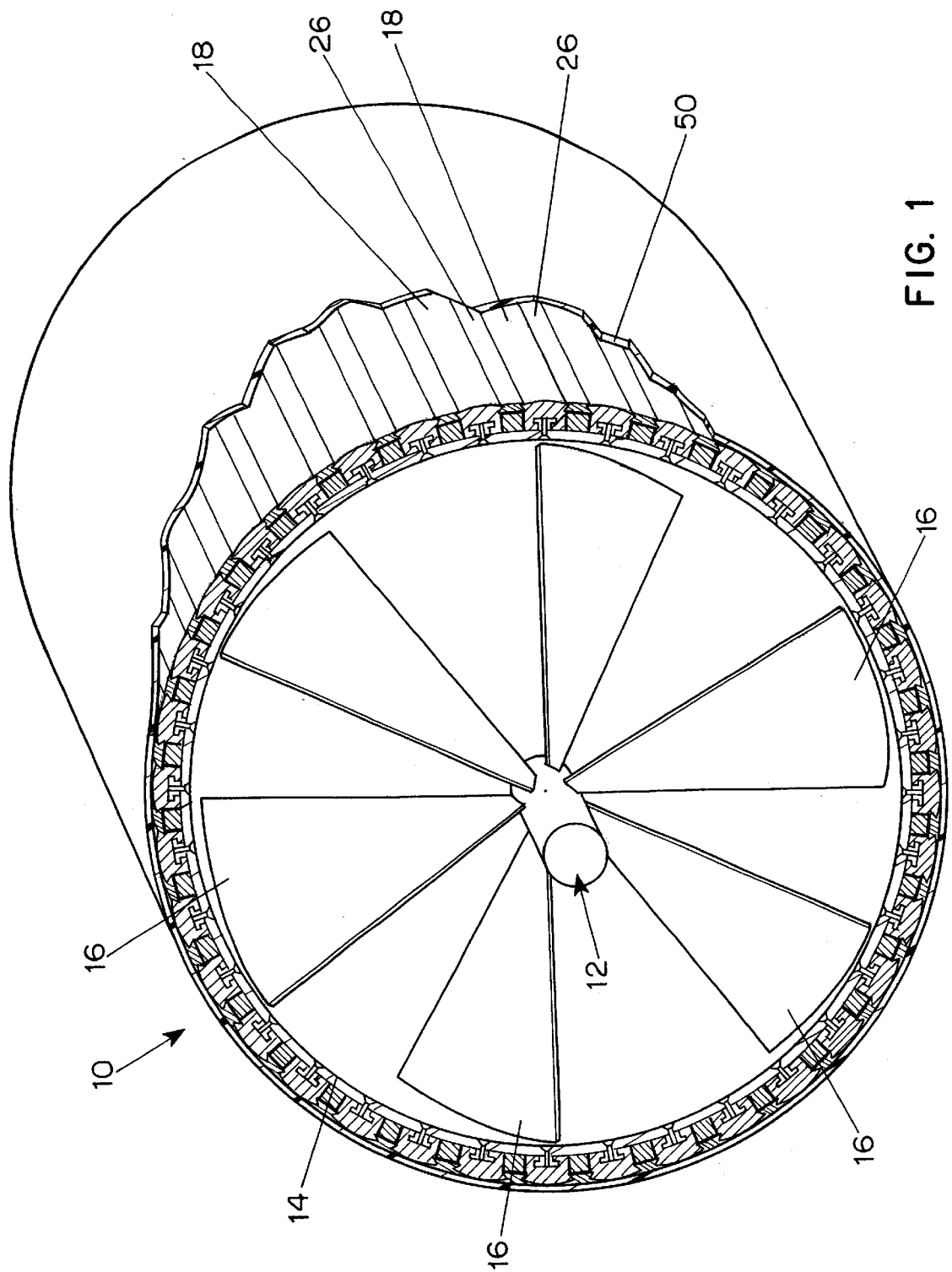
FIG. 1 is a schematic perspective view illustrating a representative embodiment of a permanent magnet rotor for an electric machine having a magnet retaining arrangement in accordance with the invention.
Figure 2:
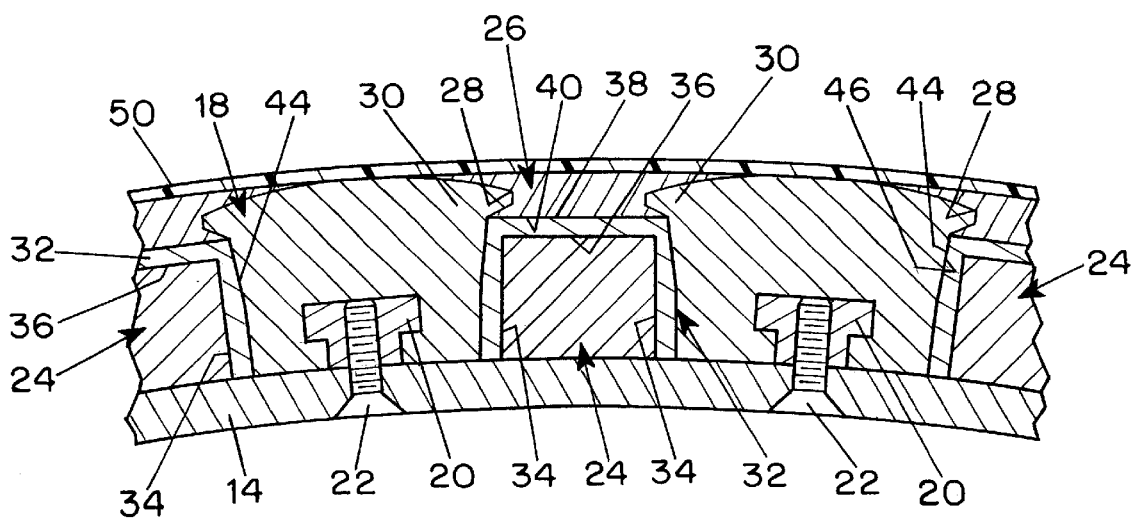
FIG. 2 is an enlarged fragmentary view of the magnet retaining arrangement shown in FIG. 1.
Figure 3:
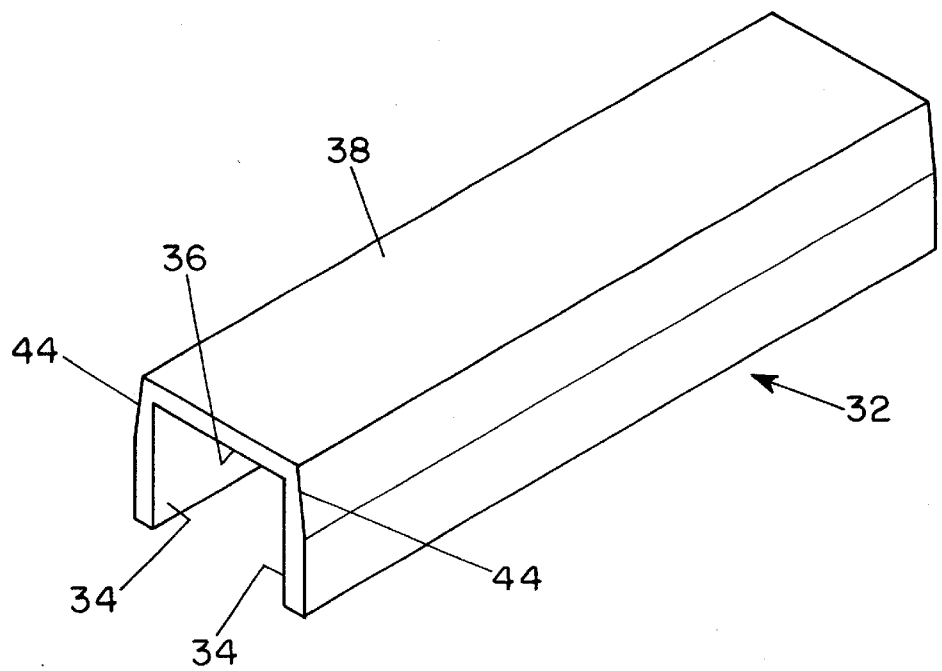
FIG. 3 is a cross sectional view showing the shape of the magnet retainer used in the arrangement shown in FIGS. 1 and 2.

In the representative embodiment of the invention illustrated in FIGS. 1–3, a rotor 10 has a shaft 12 connected to an outer rim 14 by an array of angularly spaced inclined blades 16 forming a rim-driven propeller which may be used, for example, in a propulsion pod. A spaced circumferential array of pole pieces 18, made of laminated magnetic material in the conventional manner is mechanically attached to the rim by key members 20 held by screws 22.

Between each adjacent pair of pole pieces 18 a magnet 24 is held in position by a slot wedge 26 made of nonmagnetic material and having grooves 28 in its opposite edges to receive projections 30 of the adjacent pole pieces 18.

In order to facilitate radial retention of the magnets 24 during high speed rotation of the rotor 10, an inverted U-shaped retainer 32, also made of nonmagnetic material, is located in the space between each magnet 24 and the adjacent surfaces of the pole pieces 18 and the slot wedge 26. As best seen in FIG. 3, the U-shaped retainer 32 has rectangularly arranged inner surfaces 34 and 36 to conform to the rectangular periphery of the magnet 24 and is formed with a radially outer surface 38 which engages the radially inner surface 40 of the adjacent slot wedge 26 and with circumferentially outer surfaces 44 which converge inwardly in the radially outward direction to conform to corresponding inwardly converging surfaces 46 of the adjacent pole pieces 18 to facilitate retention of the U-shaped retainer 32 and the magnet 24 enclosed therein during high speed rotation of the rotor 10.

In addition, a circumferential outer wrap 50 of fiber-reinforced polymer material surrounds the entire peripheral surface of the entire rotor structure. With this arrangement, the magnet retention is facilitated by the engaging angled surfaces 44 and 46 of the U-shaped retainer and the pole pieces as well as the fiber-reinforced polymer wrap 50.

Figure 4:
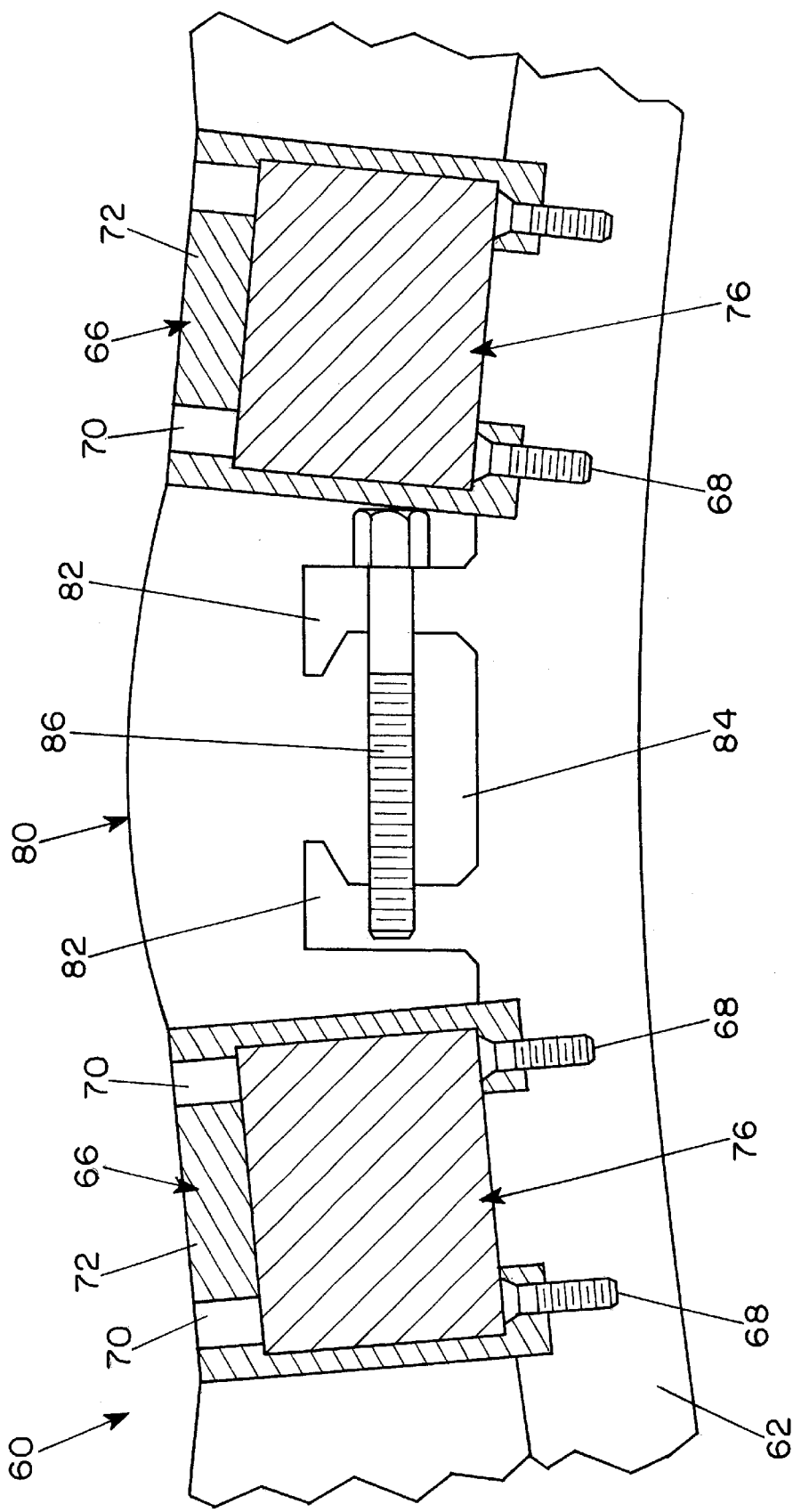
FIG. 4 is a fragmentary cross sectional view illustrating a permanent magnet rotor having an alternative magnet retaining arrangement in accordance with the invention.

In the alternative embodiment illustrated in the fragmentary view of FIG. 4, a rotor 60 has an outer rim 62 to which nonmagnetic U-shaped magnet retainers 66 are affixed by screws 68 accessible through holes 70 formed in the top wall 72 of the retainers. Permanent magnets 76 are inserted longitudinally into the channels formed in the U-shaped retainers. Pole pieces 80 between each adjacent pair of magnet retainers 66 are secured to the rim 62 by opposed jaws 82 projecting from the rim 62 to receive a correspondingly shaped portion 84 of the pole piece 80 which may be retained securely in position by a bolt 86 extending through the jaws and the portion 84.

Figure 5:
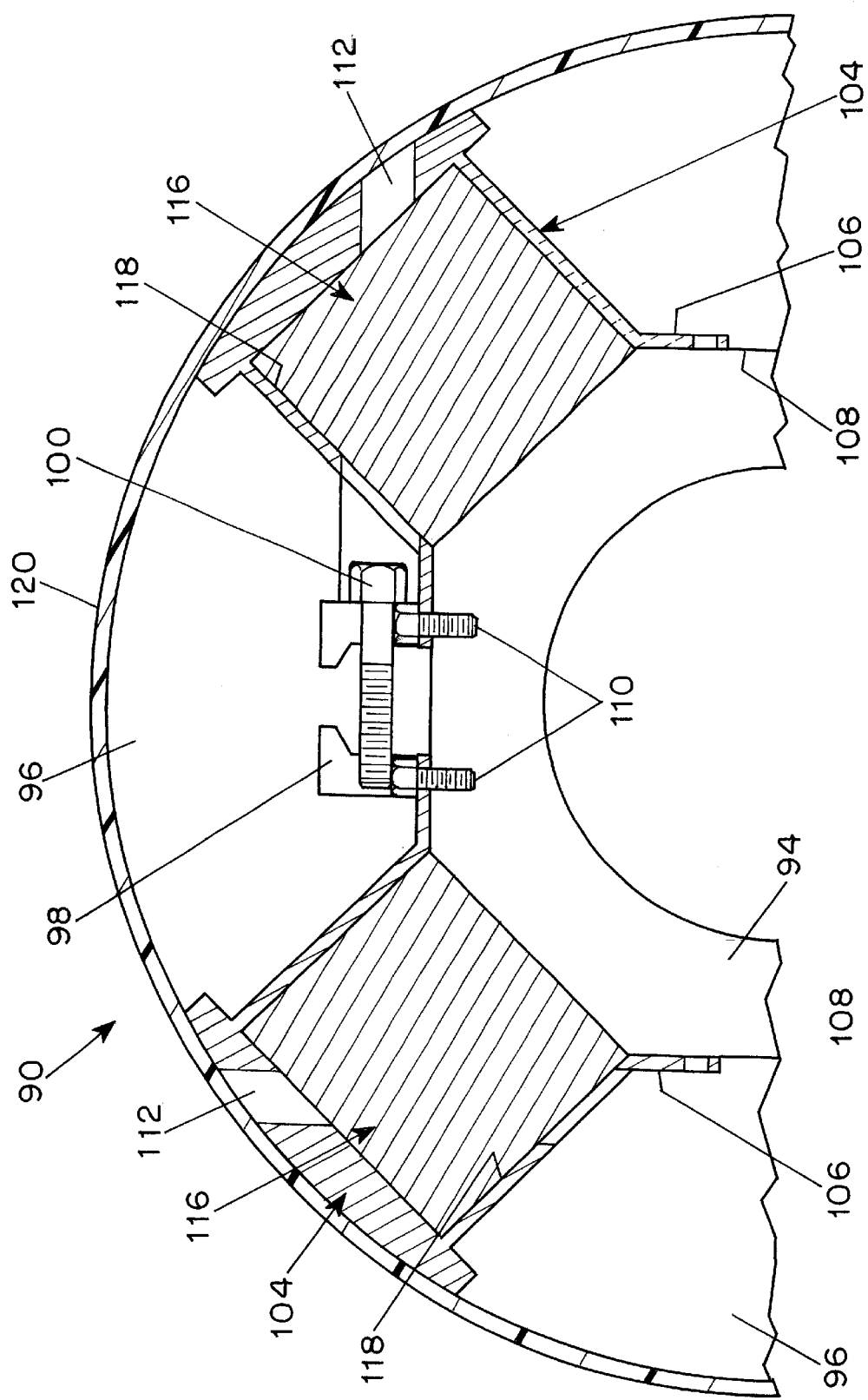
FIG. 5 is a fragmentary cross sectional view showing a permanent magnet rotor having still another embodiment of a magnet retaining arrangement in accordance with the invention.

In the further embodiment schematically shown in FIG. 5, a rotor 90 has a peripheral rim 94 to which pole pieces 96 are secured by opposed jaws 98 and a bolt 100 in the manner described with respect to FIG. 4. In this case, nonmagnetic U-shaped magnet retainers 104 have angularly projecting flanges 106 which are fastened to corresponding surfaces 108 of the rim 94 by screws 110 before the pole pieces are mounted on the rim. The U-shaped retainers have access openings 112 through which the bolts 100 can be inserted to retain the pole pieces after the retainers 104 have been secured to the rim 94. Thereafter, permanent magnets 116 are inserted into channels 118 formed by the retainers 104. With this arrangement, the magnets 116 and their retainers 104 are securely held in position during high speed rotation by the screws 110 as well as by the pole pieces 96 and their retaining bolts 100. The outer surface of the rotor may be enclosed by a fiber-reinforced polymer wrap 120 as in the other embodiments.

Although the invention has been described herein with reference to specific embodiments, many modifications and variations therein will readily occur to those skilled in the art. Accordingly, all such variations and modifications are included within the intended scope of the invention.

We claim:

1. A permanent magnet rotor arrangement comprising:

a rotor having a rim;

a circumferential array of pole pieces made of magnetic material affixed to the rotor rim;

an inverted U-shaped magnet retainer made of nonmagnetic material and formed with a channel mounted between each adjacent pair of pole pieces; and at least one permanent magnet inserted into the channel formed in each U-shaped retainer.

2. A permanent magnet rotor arrangement according to claim 1 wherein each adjacent pair of pole pieces has surfaces facing the U-shaped magnet retainer which converge inwardly in the radially outward direction and the U-shaped retainer has corresponding outer surfaces which converge inwardly in the radially outward direction and engage the inwardly converging surfaces of the pole pieces.

3. A permanent magnet rotor arrangement according to claim 1 wherein the U-shaped permanent magnet retainer is affixed to the rotor rim by a mechanical attachment.

4. A permanent magnet rotor arrangement according to claim 3 wherein the mechanical attachment comprises screws.

5. A permanent magnet rotor arrangement according to claim 4 wherein the U-shaped magnet retainer has projecting flanges engaging a rim portion and the adjacent pole pieces extend in the angular direction over the projecting flanges.

6. A permanent magnet rotor arrangement according to claim 1 including an outer wrap of fiber-reinforced polymer material surrounding the rotor.

7. A permanent magnet rotor arrangement according to claim 1 wherein the pole pieces are mechanically connected to corresponding rim portions by bolts.

* * * * *